United States Patent
Wu et al.

(10) Patent No.: US 10,387,287 B1
(45) Date of Patent: Aug. 20, 2019

(54) TECHNIQUES FOR RATING SYSTEM HEALTH

(71) Applicant: EMC IP Holding Company LLC, Hopkinton, MA (US)

(72) Inventors: Jun Wu, Shanghai (CN); Eric Wu, Shanghai (CN); Haitao Zhou, Shanghai (CN); Yourong Wang, Shanghai (CN); Wei Wang, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 24 days.

(21) Appl. No.: 15/387,839

(22) Filed: Dec. 22, 2016

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 11/34* | (2006.01) |
| *G06F 9/54* | (2006.01) |
| *G06F 11/30* | (2006.01) |

(52) U.S. Cl.
CPC .......... *G06F 11/3409* (2013.01); *G06F 9/542* (2013.01); *G06F 11/3024* (2013.01)

(58) Field of Classification Search
CPC .................................................. G06F 11/3409
USPC .......................................................... 719/318
See application file for complete search history.

(56) References Cited

U.S. PATENT DOCUMENTS

| | | | | |
|---|---|---|---|---|
| 2005/0065753 | A1* | 3/2005 | Bigus | G06F 11/3447 702/186 |
| 2008/0008094 | A1* | 1/2008 | Gilfix | H04L 67/322 370/235 |
| 2015/0106873 | A1* | 4/2015 | Marsh | G06F 21/577 726/1 |
| 2015/0127783 | A1* | 5/2015 | Lissack | H04L 41/5054 709/220 |

* cited by examiner

*Primary Examiner* — Timothy A Mudrick
(74) *Attorney, Agent, or Firm* — Muirhead and Saturnelli, LLC (57) ABSTRACT

Techniques are described that provide for determining health of a system and its components and may include: receiving a hierarchical structure including a plurality of levels of nodes representing the system and components of the system; performing first processing that calculates an overall score denoting health of the system, wherein the overall score is determined in accordance with a plurality of other scores for the components in the system, the plurality of other scores being associated with nodes of the hierarchical structure; and displaying, in a user interface, the overall score.

20 Claims, 7 Drawing Sheets

TECHNIQUES FOR RATING SYSTEM HEALTH

BACKGROUND

Technical Field

This application generally relates to systems and techniques for assessing the health of such systems and its components.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of techniques herein is a method for determining health of a system and its components comprising: receiving a hierarchical structure including a plurality of levels of nodes representing the system and components of the system; performing first processing that calculates an overall score denoting health of the system, wherein said overall score is determined in accordance with a plurality of other scores for the components in the system, said plurality of other scores being associated with nodes of the hierarchical structure; and displaying, in a user interface, the overall score. A root node of the hierarchical structure may represent the overall score denoting health of the system. The first processing may include obtaining first scores for leaf nodes of the hierarchical structure; and determining one or more second scores for one or more parent nodes of the leaf nodes. Each of the second scores of a parent node may be a weighted sum of scores of a portion of the leaf nodes that are children of the parent node in the hierarchical structure. Each node of the hierarchical structure that is not a root node, is not a leaf node and has one or more child nodes may have an associated score determined as a weighted sum of scores of its child nodes. The first processing may include performing normal processing that determines an initial value for the overall score; and performing additional processing which performs any needed adjustment to the initial value for the overall score. The additional processing may include performing processing that overrides the initial value and determines a revised value for the overall score in accordance with an occurrence of a special case or condition. The overall score may be associated with a root node of the hierarchical structure and a first user interface element that is selectable. Responsive to selecting the first user interface element, second processing may be performed comprising updating the user interface to include additional scores associated with child nodes of the root node, wherein each of said additional scores is associated with a user interface element that is selectable. The method may selecting a second user interface element associated one of the additional scores, said associated one of the additional scores being associated with a second parent node of the hierarchical structure; and responsive to selecting the second user interface element, updating the user interface to include second additional scores associated with child nodes of the second parent node. The method may include updating the user interface to include one or more user interface elements for one or more corrective actions associated with a leaf node of the hierarchical structure. The one or more user interface elements may include a first user interface element that, when selected, results in automatically performing a particular one of the corrective actions corresponding to the first user interface element. The system may be a data storage system and the components may include any of storage components, network components, computation components.

In accordance with another aspect of techniques herein is a system comprising: one or more processors; and a memory comprising code stored therein, that, when executed by the one or more processors, performs a method for determining health of a system and its components comprising: receiving a hierarchical structure including a plurality of levels of nodes representing the system and components of the system; performing first processing that calculates an overall score denoting health of the system, wherein said overall score is determined in accordance with a plurality of other scores for the components in the system, said plurality of other scores being associated with nodes of the hierarchical structure; and displaying, in a user interface, the overall score.

In accordance with another aspect of techniques herein is a computer readable medium comprising code stored thereon that, when executed, performs a method for determining health of a system and its components comprising: receiving a hierarchical structure including a plurality of levels of nodes representing the system and components of the system; performing first processing that calculates an overall score denoting health of the system, wherein said overall score is determined in accordance with a plurality of other scores for the components in the system, said plurality of other scores being associated with nodes of the hierarchical structure; and displaying, in a user interface, the overall score. A root node of the hierarchical structure may represent the overall score denoting health of the system. The first processing may include obtaining first scores for leaf nodes of the hierarchical structure; and determining one or more second scores for one or more parent nodes of the leaf nodes. Each of the second scores of a parent node may be a weighted sum of scores of a portion of the leaf nodes that are children of the parent node in the hierarchical structure. Each node of the hierarchical structure that is not a root node, is not a leaf node and has one or more child nodes, may have an associated score determined as a weighted sum of scores of its child nodes. The first processing may include performing normal processing that determines an initial value for the overall score; and performing additional processing which performs any needed adjustment to the initial value for the overall score. The additional processing may include performing processing that overrides the initial value and determines a revised value for the overall score in accordance with an occurrence of a special case or condition.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
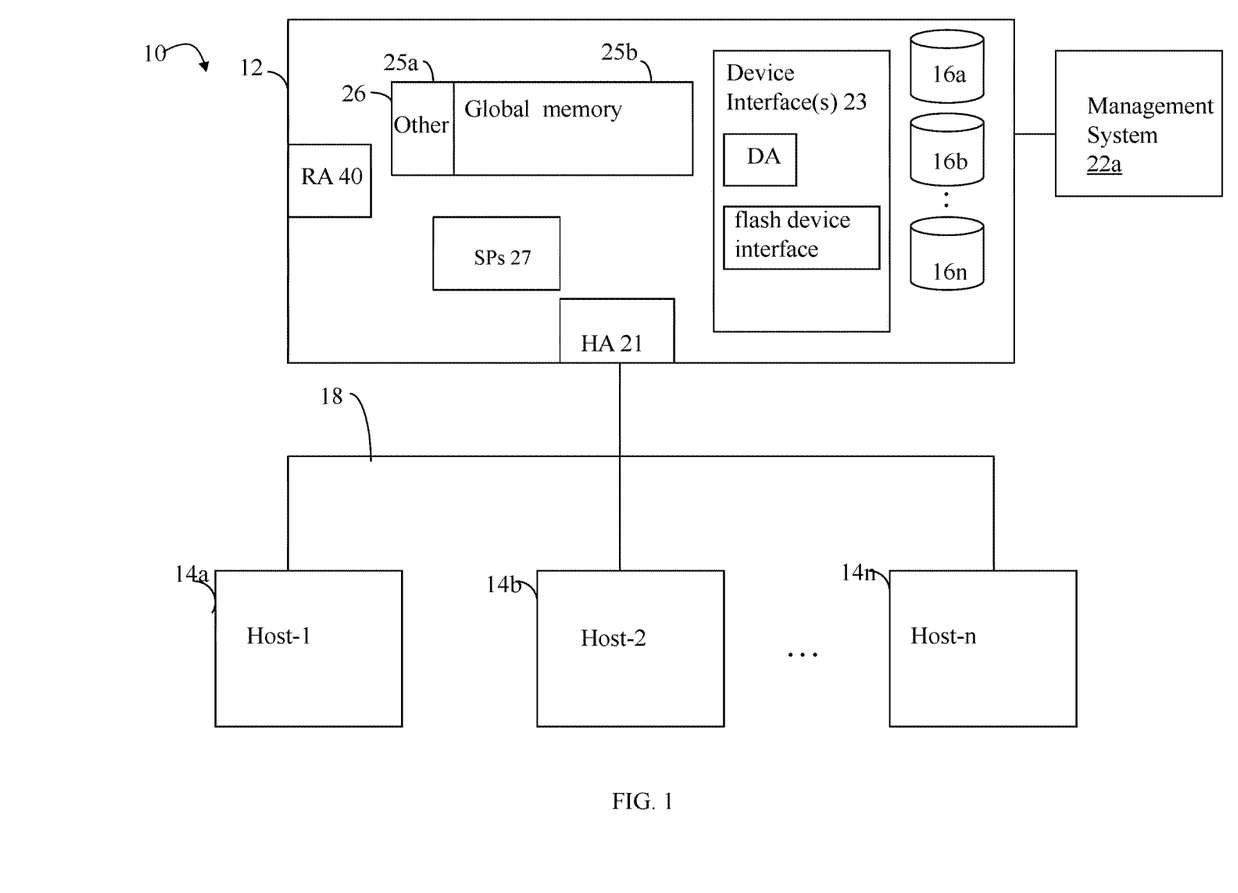
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n (e.g., non-volatile physical data storage devices or PDs used as backend physical storage of the system 12). The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache (also referred to as a data cache) that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

As known in the art, a LUN may have physical storage provisioned on one or more PDs of the data storage system where the LUN has a logical address space or range. Logical addresses of the LUN may be mapped to physical storage locations on the PDs. The logical address range for the LUN may, for example, range from a starting logical address of 0 to a maximum logical address that varies depending on the capacity of the particular LUN. In one embodiment, each logical address may denote a logical block address or offset from the starting LBA of 0. Each single block, such as LBA 0, may denote a block or generally some amount of storage that may vary with data storage system (e.g., block size may vary with data storage system).

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In connection with a system, such as a data storage system or data storage array as described herein, what will now be described are techniques that may be used to provide a user with a rating or indicator regarding the current health of the overall system and its components. Such techniques may further provide for a detailed breakdown of different components and subcomponents of a system. In at least one embodiment, a component may have a corresponding descriptive category. Related subcomponents of the component and its corresponding category may be grouped and associated with the component. In at least one embodiment, the system and its components and subcomponents may be represented in hierarchical structure of multiple levels of nodes. As an example, the hierarchical structure in at least one embodiment may be a tree like structure with the system represented by the root node at the top of the tree at a first or highest level where the root node may have any suitable number of descendant nodes at lower levels of the structure. Generally, the tree or hierarchical structure may have any suitable number of levels in the tree where each parent node at a level may have zero or more child nodes at a lower level in the tree (e.g., lever of a child node is lower than that of its parent in that the child node is one level further from the root node than its parent). In such an system, the parent node may denote a component where the child nodes of that parent node may represent the subcomponents of the component. In the case where a node has no child nodes, the node may also be referred to as a leaf or leaf node at a bottom level of the tree. The tree or hierarchical structure may be the data structure used in connection with a rating algorithm that calculates a health rating, indicator or score for the system as well as for different components of the system. In at least one embodiment, the tree or hierarchical structure may be presented, in whole or in relevant portions, in a user interface, such as a graphical user interface (GUI). As described in more detail below, the hierarchical structure may be used in providing a visual representation of the system and its components to a user. Additionally, in connection with providing scores denoting the health of the system and various components, the nodes of the hierarchical structure may be associated with customized weights for the various components represented by the nodes. The foregoing customized weights may be used in connection with an algorithm and various equations for calculating the scores where such scores may be characterized as metrics, indicators, ratings, and the like, denoting the health status of the system and its components. The foregoing and other aspects of techniques herein are described in more detail in following paragraphs.

Following description and figures include specific examples in connection with a data storage system and its components in a network environment. However, such techniques described herein are more generally applicable for use with any suitable system and its components and is not limited to the particulars of the examples provided herein for illustration.

Figure 2:
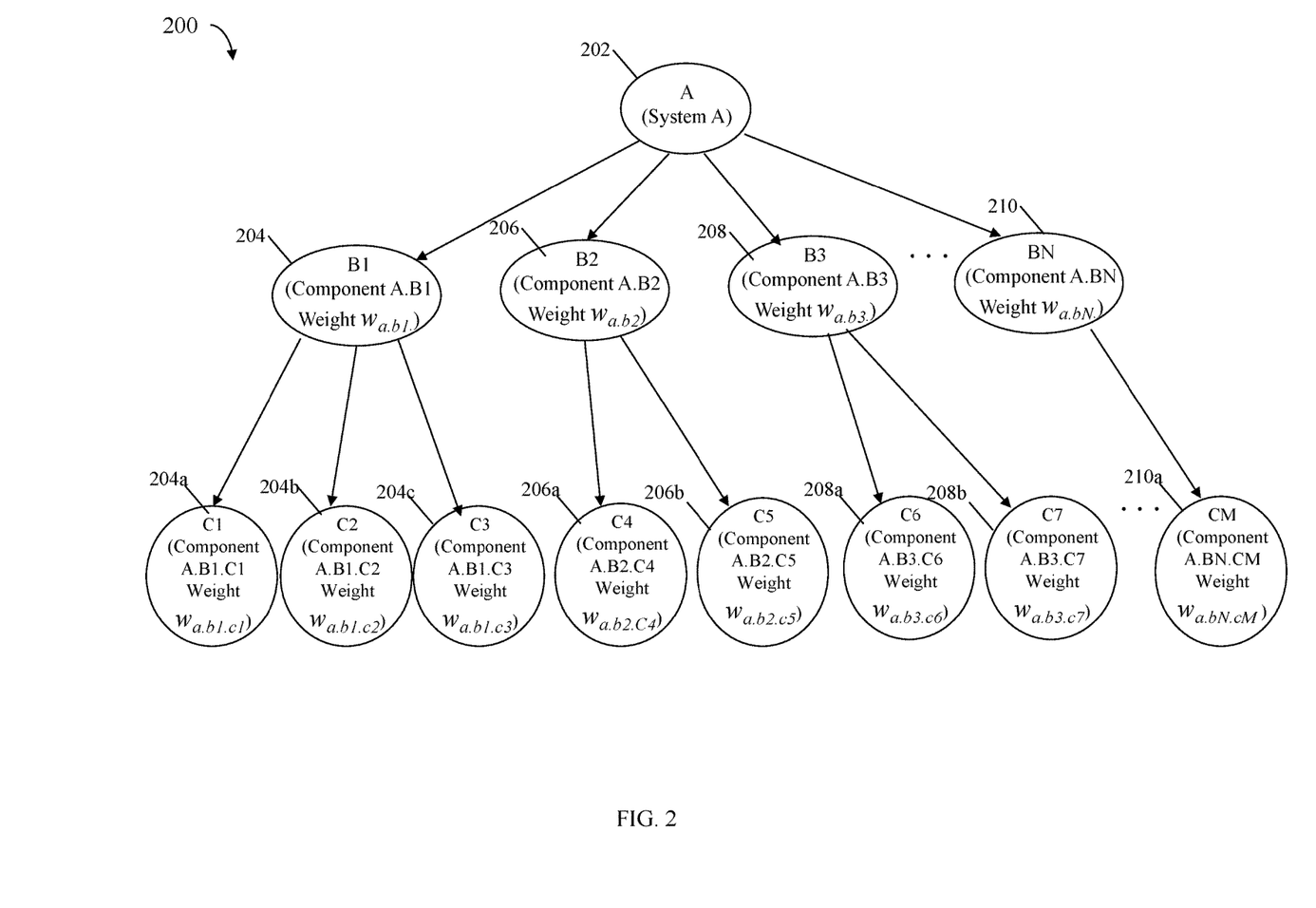
FIG. 2 is an example of a hierarchical structure that may be used in an embodiment in accordance with techniques herein.

Referring to FIG. 2, shown is an example 200 of a hierarchical structure that may be used in an embodiment in accordance with techniques herein. In this example, the structure 200 is a tree structure used in connection with representing the system and its components. The structure of the example 200 may be additionally used in connection with an algorithm to rate the system health of the data storage system and its components. The example 200 is a tree structure including 3 levels of nodes with the root node 202 being level 1 denoting the top or highest level in the tree. At level 2 in the tree are nodes B1 204, B2 206, B3 208 and BN 210. At level 2 in the tree are nodes C1 204a-C3 204c, nodes C4 206a-C5 206b, nodes C6 208a-C7-208b and node CM 210a. Generally, a node at level L in the tree may be characterized as a parent node having one or more child nodes at level L+1 where such child nodes are connected to the parent node in the tree. The root node 202 has 4 child nodes 204, 206, 208 and 210 at level 1. Node 204 at level 1 has child nodes 204a-c. Node 206 at level 1 has child nodes 206a-b. Node 208 at level 1 has child nodes 208a-b. Nodes 210 at level 1 has child node 210a. The nodes at level 2 at the bottom of the tree are also leaf nodes.

Generally, the components of the system may include physical and logical entities in the system. Examples of physical entities may include, for example, physical network ports, switches, physical storage devices, and the like. Examples of logical entities may include, for example, RAID groups, LUNs or provisioned logical devices, and the like. Both LUNs and RAID groups are described elsewhere herein in more detail and also known in the art.

In this example, the tree structure may represent relationships between the various components of the system using the nodes and connections between various nodes. The example 200 includes directional arrows connecting parent and child nodes representing the component (parent) and subcomponent (child) relationship. Node 202 represents the overall system A and has an associated score that may be calculated using an algorithm and equations described in following paragraphs using various weights associated with the different nodes. A weight associated with a particular node at a level may denote the relative importance of the component represented by the particular node at that level. The relative importance may be with respect to other nodes representing other components at the same level and also where all nodes at the same level have the same parent node. For example, nodes 204a-c are child nodes of the same parent node 204 and each of 204a-c, representing a different component, may have a relative weight denoting the relative importance of that particular represented component. To further illustrate, in at least one embodiment, the total of the weights of all child nodes (e.g., 204a-c) of a particular parent node (e.g., 204) may be 100% and each such child node (e.g., each of 204a-c) may be assigned a weight denoting a relative importance of that particular child node (e.g., such as node 204a) with respect to the other child nodes (e.g., such as importance of 204a in comparison to 204b-c).

In this example nodes 204, 206, 208 and 210 may denote components each associated with a different category of other subcomponents of the system. A component represented by a node in the example 200 may be described using a path of the node in the tree structure. A path is a traversal of the tree structure from the root node to the particular node where the path lists, in sequential order, the nodes traversed from the root node to reach the particular node in the structure. For example, node B1 204 may represent component A.B1. Associated with each node is a weight for the component represented by the node. For example node B1 204 representing component A.B1 has associated weight $W_{a.b1}$. In at least one embodiment, techniques herein may use a weighted average of the scores of the different components. Each component starting with the leaf nodes may be assigned a score, such as in the inclusive range of 0 through 100, denoting the health of the particular component represented by the leaf node. Using such scores and associated weights of the leaf nodes such represented by level 3 nodes (e.g., 204a-c; 206a-b; 208a-b; 210), scores of nodes at level 2 (e.g., nodes 204, 206 and 208) may be determined. Still further, a score of the root node 202 at level 1 may be calculated using the scores and weights of nodes at level 2. Generally, in at least one embodiment, the score of a parent node may be calculated as a weighted average of the scores and weights of its child nodes. This is described in more detail below. It should be noted that in the example 200, each of the nodes includes its corresponding weight as used in connection with the equations below to calculate the scores of the different components.

The overall score, "a", associated with node A 202 of the system A may be a value in the inclusive range from 0 through 100, where 0 denotes the lowest level of health/unhealthiest state such as associated with a failed or inoperable component, and where 100 denotes the highest level of health/healthiest state of a component (e.g., no problems with health). The score, a, of the system A, represented by node 202 may be calculated as follows in EQUATION 1:

$$a=b1*w_{a.b1}+b2*w_{a.b2}+b3*w_{a.b3}+ \ldots +bn*w_{a.bn} \quad \text{EQUATION 1}$$

In EQUATION 1, $w_{a.b1}, w_{a.b2}, w_{a.b3}, \ldots, w_{a.bn}$ denote the weights, respectively, for Components A.B1, A.B2, A.B3, and A.Bn where $w_{a.b1}+w_{a.b2}\ w_{a.b3}+ \ldots +w_{a.bn}=100\%$.

The score, b1, of Component A.B1 represented by node 204 may be a value in the inclusive range from 0 through 100 (as described above). The score b1, of component A.B1 represented by node 204 may be calculated as follows in EQUATION 2:

$$b1=c1*w_{a.b1.c1}+c2*a_{a.b1.c2}+c3*_{a.b1.c3} \quad \text{EQUATION 2}$$

In EQUATION 2, $w_{a.b1.c1}, w_{a.b1.c2}, w_{a.b1.c3}$ denote the weights, respectively, for Components A.B1.C1, A.B1.C2, A.B1.C3 where $w_{a.b1.c1}+w_{a.b1.c2}+w_{a.b1.c3}=100\%$ The score, b2, of Component A.B2 represented by node 206 may be a value in the inclusive range from 0 through 100 (as described above). The score, b2, of component A.B2 represented by node 206 may be calculated as follows in EQUATION 3:

$$b2=c4*w_{a.b2.c4}+c5*w_{a.b2.c5} \quad \text{EQUATION 3}$$

In EQUATION 3, $w_{a.b2.c4}, w_{a.b2.c5}$ denote the weights, respectively, for Components A.B2.C4, A.B2.C5 where $w_{a.b2.c4}+w_{a.b2.c5}=100\%$ The score b3, of Component A.B3 may be a value in the inclusive range from 0 through 100 (as described above). The score b3, for Component A.B3 represented by node 208 may be calculated as follows in EQUATION 4:

$$b3=c6*w_{a.b3.c6}+c7*w_{a.b3.c7} \quad \text{EQUATION 4}$$

In EQUATION 4, $w_{a.b3.c6}, w_{a.b3.c7}$ denote weights, respectively, for Components A.B3.C6, A.B3.C7 where $w_{a.b3.c6}+w_{a.b3.c7}=100\%$.

Generally, the structure in the example 200 may be readily applied for use with any number of levels where each node has any number of child nodes. Also, generally, a score of a parent node is determined as a weighted score of the parent node's children in accordance with weights and scores of such child nodes. The foregoing calculation of a weighted score that is a weighted sum of the different scores of the child nodes may be generally applied in connection with calculating the score of any parent node from its children. For a parent node having one or more child nodes, a score may be determined for each child node and a weight may be assigned to each child node. A score for the parent may be determined by 1) determining a first value for each child node by multiplying each child node score by the weight associated with the child node; and then 2) adding the first values associated with the child nodes of the parent.

In at least one embodiment, the weights associated with the different components and nodes may be predefined having a value assigned prior to calculation. An embodiment may further allow such weights to be configurable or otherwise be fixed as may be suitable for the particular component(s) and system.

In connection with a particular example illustrating use of the structure of 200, consider a data storage system in a network environment such as described in connection with FIG. 1. In such a system and environment, the components and associated weights may be represented in a structure 200:

Component A.B1: Network; weight: 35% represented by node 204

Component A.B2: Computation; weight: 30% represented by node 206

Component A.B3: Storage; weight: 35% represented by node 208

Component A.B1.C1: Network.Server; weight: 40% represented by node 204a

Component A.B1.C2: Network.ArrayInterface; weight: 30% represented by node 204b

Component A.B1.C3: Network.SwitchConnection; weight: 30% represented by node 204c Component A.B2.C4: Computation.Firmware; weight: 30% represented by node 206a Component A.B2.C5: Computation.OperatingEnvironment; weight: 70% represented by node 206b Component A.B3.C6: Storage.RaidGroups; weight: 40% represented by node 208a Component A.B3.C7: Storage.LUNs; weight: 60% represented by node 208b In the foregoing, components at level 1 represented by nodes 204, 206 and 208 represent, respectively, general categories of network, computation and storage.

The network component category 204 represents those subcomponents providing network connectivity for the data storage system whose health is represented by root node 202. Component A1.B1.C1 represented by node 204a may denote network connectivity between the data storage system and one or more hosts. Component A1.B1.C2 represented by node 204b may denote the various ports of the data storage system connected to the network (e.g., where data storage devices such as LUNs are exposed to hosts over such ports and where I/O requests are and received at such ports by the data storage system). Component A1.B1.C3 represented by node 204*c* may denote the switch to which the data storage system is connected (e.g., where hosts sending I/Os to the data storage system may also be connected to the switch). In this manner, each of the subcomponents 204*a-c* represent a logical grouping of components providing a particular aspect of network connectivity.

The computation component category 206 represents those subcomponents related to CPUs and operating system environment of such processors of the data storage system whose health is represented by root node 202. Component A1.B2.C4 represented by node 206*a* may denote the firmware on the data storage system. Component A1.B2.C5 represented by node 206*b* may denote the operating environment, such as operating system, file system, and other software on the data storage system, as well as general status of the CPUs or processors. In this manner, each of the subcomponents 206*a-b* represent a logical grouping of components providing a particular aspect of computation.

The storage component category 208 represents those subcomponents related to physical and/or logical storage of the data storage system whose health is represented by root node 202. Component A1.B3.C6 represented by node 208*a* may denote the RAID groups on the data storage system. Component A1.B3.C7 represented by node 208*b* may denote the LUNs. In this manner, each of the subcomponents 208*a-b* represent a logical grouping of components providing a particular aspect of storage. In connection with the foregoing, LUNs are generally described above. As known in the art, a RAID (redundant array of independent disks) group is a group of physical storage devices or members providing different levels of protection and fault tolerance within the RAID group. A RAID group provides an associated level of protection based on a particular configuration of the physical drives comprising the RAID group. The particular level of protection provided by a RAID group may be one of standard and/well known levels and configurations (e.g., RAID-0, RAID-1, RAID-5, RAID-6, and the like). In at least one embodiment, physical drives may be configured into RAID groups of one or more RAID levels. As known in the art, LUNs may have storage provisioned from, or built on top of, the RAID groups.

Figure 3:
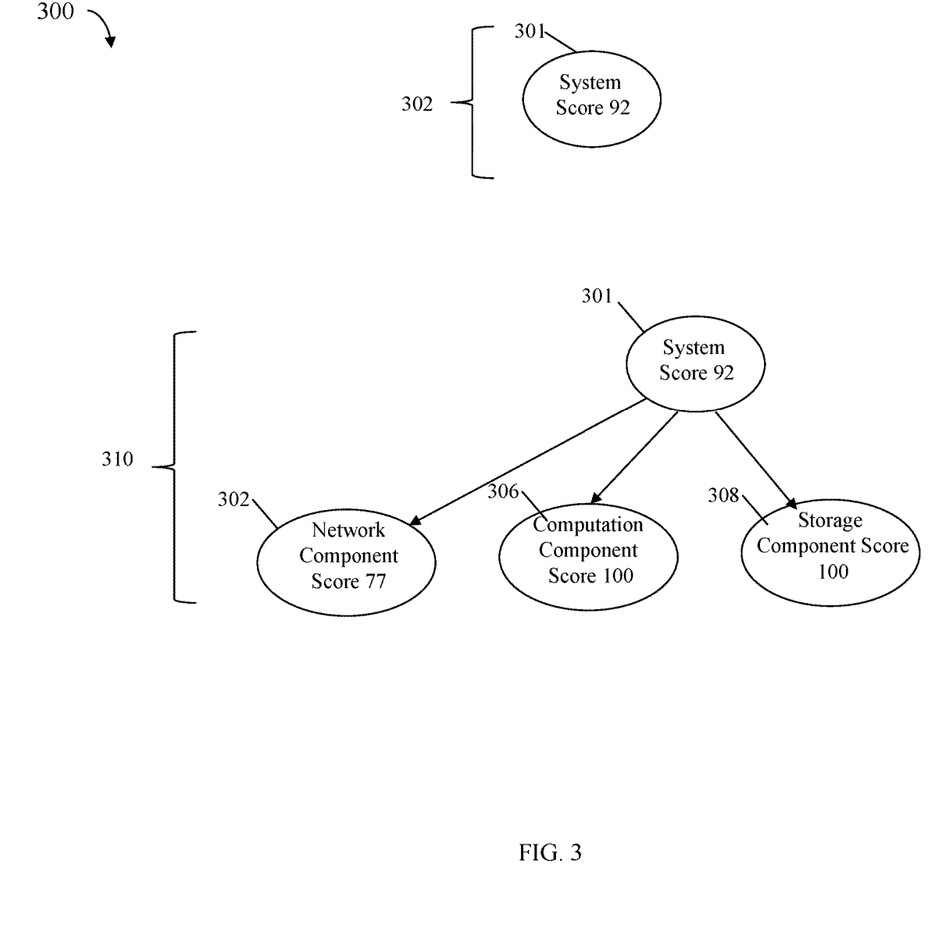
FIGS. 3, 4, 5, and 6 illustrate information that may be included in a user interface display in an embodiment in accordance with techniques herein.

Below is a further example illustrating how various scores may be calculated based on the above description and how a customer may use such scores. With reference to FIG. 3 at a first point in time, a UI display 302 may include only the root node 301 displayed with the system score of 92. The overall system health score of 92 may displayed, for example, as a data item on a UI dashboard. The system health score of 92 may be included in a selectable UI element 301 (e.g., button). Responsive to selecting UI element 301, the UI display may be populated with additional detail regarding the child nodes or subcomponents of level 1 of the tree structure (200 of FIG. 2) having scores used in calculating the overall system health score of 92. Consistent with discussion above and in connection with EQUATION 1, the child nodes and associated scores for Network, Computation, and Storage (e.g., corresponding to nodes 204, 206 and 208 of FIG. 2) may be displayed such as illustrated by 310. In 310, the UI display may be updated to additionally includes nodes 302, 306 and 308 annotated with component labels or descriptions and associated component scores: node 302: Network component score 77, node 306: Computation component score 100, and node 308: Storage component score 100. In accordance with EQUATION 1, the system health score of 92 is calculated as: (77*35%)+(100*30%)+(100*35%)=92.

The user may generally attempt to make one or more subsequent UI selections on various displayed nodes which are selected UI elements to drill down and find more detail on related subcomponents and associated scores. The foregoing may facilitate problem solving and investigation by narrowing down, through various UI selections, the unhealthy/least healthy component(s) attributing to the overall system score of 92 rather than for example 100. In this example, the user may view that the network component score of 77, node 302, is the only displayed component category that is not in perfect health/healthy status as represented by a component score of 100 for each of nodes 306 and 308. In 310, elements 302, 306 and 308 may be selectable UI element. Responsive to selecting UI element 302, the UI display may be updated as illustrated in the example 400 of FIG. 4. In the example 400, the UI display has been updated to additionally include nodes 302*a-c* (corresponding to nodes 204*a-c* of FIG. 2) which denote subcomponents of the network component category represented by 302. Selecting 302 is an action by the user to drill down and find out further component health information regarding those network subcomponents contributing to the score of 77, rather than 100. As illustrated, node 302*a* denotes a network server score of 50, node 302*b* denotes a network array interface score of 90, and node 302*c* denotes a network switch connection score of 100. From the foregoing scores of 302*a-c*, a user may view that there is a minor problem with the network array interface (e.g., node 302*b* score of 90) and that there is a more severe health problem with the network server (e.g., node 302*a* score of 50). In accordance with EQUATION 2, the Network component score of 77 is calculated as: (50*40%)+(90*30%)+100*30%=77.

Figure 4:
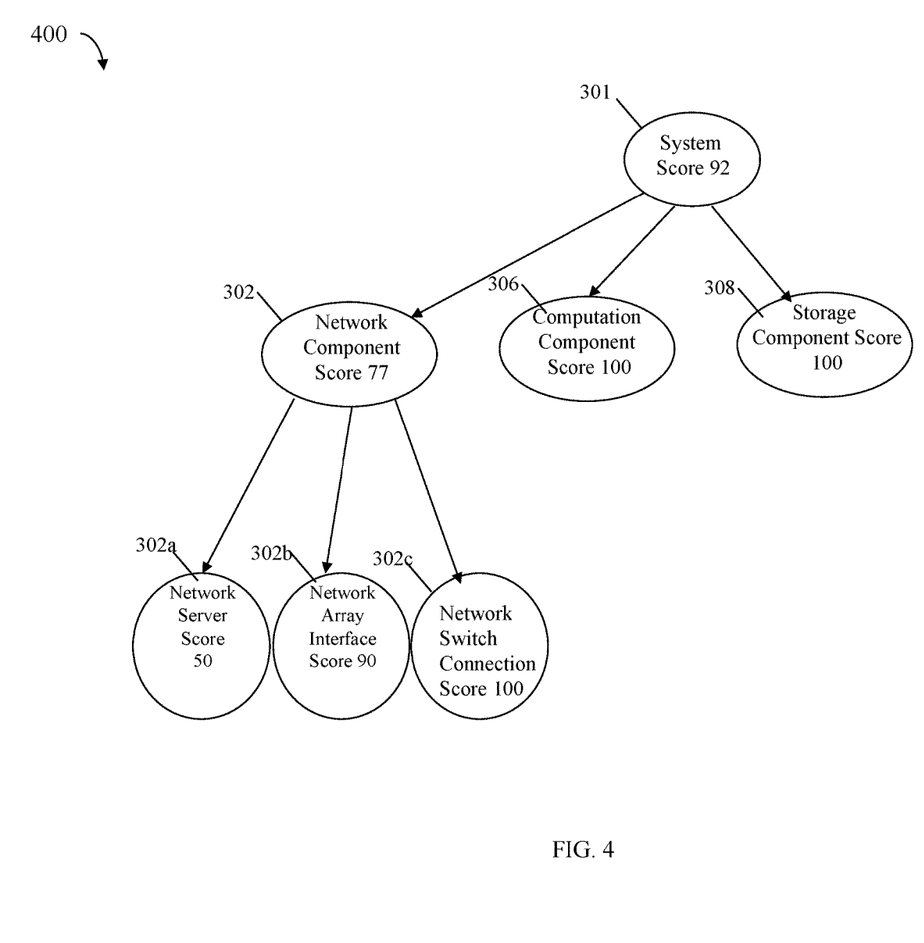

In the example 400, elements 302*a-c* may each be selectable UI elements as discussed above. Additionally, elements 302*a-c* may each be leaf nodes corresponding, respectively, to nodes 204-*c* as illustrated in FIG. 2. In at least one embodiment, a leaf node and its associated selectable UI element (e.g., 302*a-c*) may be associated with a list of one or more suitable actions a user may take in order to remedy a problem with the subcomponent(s) represented by the leaf node. For example, a user may select UI element 302*a* to further display a list of potential actions that may be taken to remedy or diagnose the problem causing the unhealthy score of 50. As a variation, the UI element 302*a* may display a description of an action and a link that, when selected, automatically performs the described action in an attempt to remove, alleviate, and/or further diagnose the problem causing the score of 50.

Figure 5:
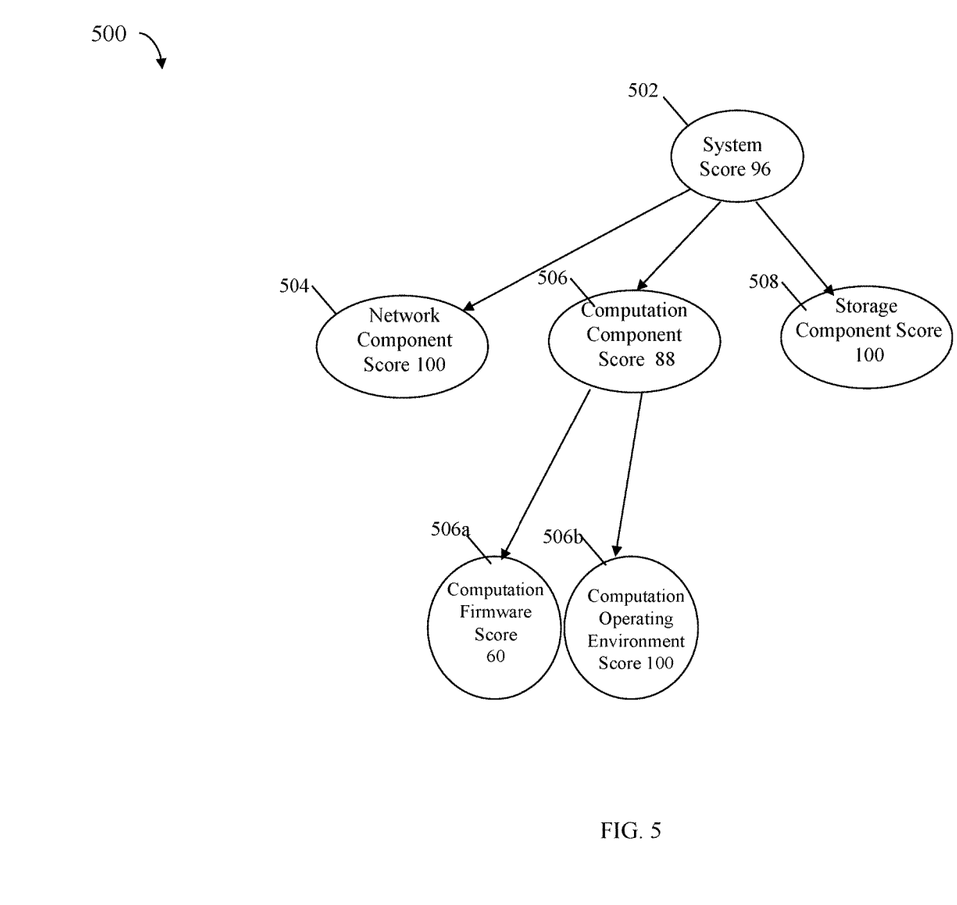

To further illustrate, reference is made to another example 500 of FIG. 5. In the example 500, nodes 502, 504, 506 and 508 correspond, respectively, to nodes 301, 302, 306 and 308 of FIG. 4 with the difference that the nodes of FIG. 5 includes different scores. Each of 502, 504, 506, 506*a-b* and 508 may denote selectable UI elements. The UI elements 504, 506 and 508 may be displayed responsive to selection of UI element 502. UI elements 506*a-b* may further be displayed responsive to selection of UI element 506 (in a manner similar to that as described above regarding selection of UI element 302 of FIG. 4). The foregoing selections of 502 and 506 may be made by a user of the UI in attempts to drill down and locate the source, problem or reason for the system score 96 of 502 and the computation component score 88 of 506. In this example, a user may view 506*a* and determine that there is a problem with the firmware adversely affecting the scores of 506 and 502. In this further illustration, UI element 506a representing component A.B2.C4, firmware has a score c4 of 60. The firmware version may be out of date whereby the data storage system does not having installed on it the latest or most recent recommended firmware version. Associated with UI element 506a may be a display window with a message or prompt of 'Firmware version xxx is out-of-date'. The UI element 506a may also provide a button that is labeled 'upgrade firmware version from xxx to yyy' as the corrective action to be taken whereby selection of the button results in the firmware automatically being upgraded to the version yyy (e.g. automatic internet download and installation from appropriate network/internet location).

Figure 6:
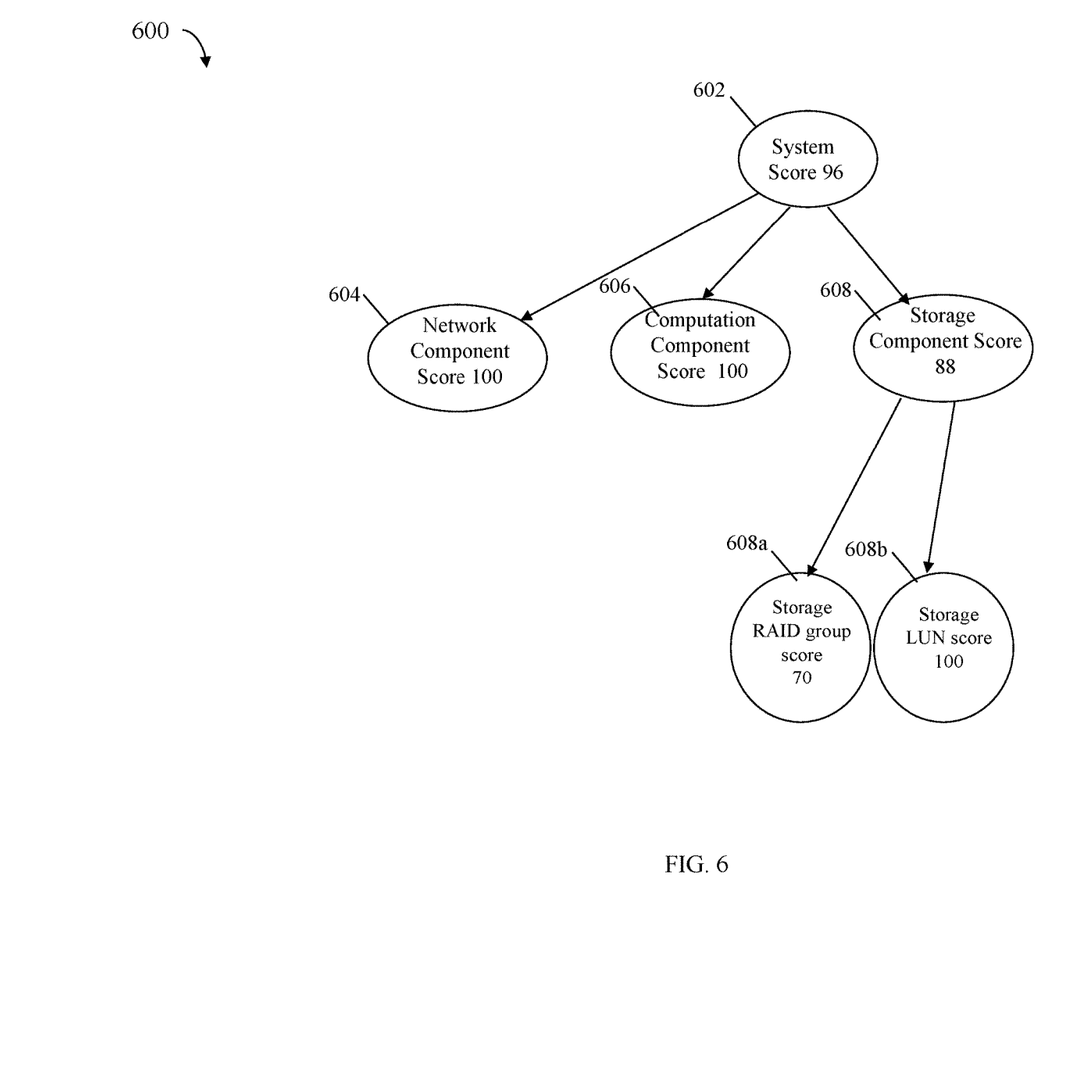

Referring to FIG. 6, shown is another example illustrating information and UI elements that may be included in a UI display in an embodiment in accordance with techniques herein. In the example 600, nodes 602, 604, 606 and 608, correspond, respectively, to nodes 502, 504, 506 and 508 of FIG. 5 with the difference that the nodes of FIG. 6 includes different scores. Each of 602, 604, 606, 608a-b and 608 may denote selectable UI elements. The UI elements 604, 606 and 608 may be displayed responsive to selection of UI element 602. UI elements 608a-b may further be displayed responsive to selection of UI element 608 (in a manner similar to that as described above regarding selection of UI element 302 of FIG. 4). The foregoing selections of 602 and 208 may be made by a user of the UI in attempts to drill down and locate the source, problem or reason for the system score 96 of 602 and the storage component score 88 of 608. In this example, a user may view 608a and determine that there is a problem with the one of the RAID groups adversely affecting the scores of 608 and 602. In this further illustration, UI element 608a representing component A.B3.C6, RAID groups, has a score c6 of 70 indicating there is a problem with one or more of the RAID groups causing the score c6 in UI element 608a to be 70 rather than a higher healthier score such as 100. In this example, assume there is a single drive fault with a drive in a RAID-5 group where the faulted or bad drive needs to be replaced and there is no available spare drive. In this case, associated with UI element 608a may be a display window with a message or prompt of 'Single disk xxx fault in RAIDS x, please order and replace the disk from service provider by clicking below service link'. As noted, the UI element 608a may also service link/hyper link that, when selected, connects to an internet location or website of the service provider where a new drive may be ordered. Thus, selection of the link may be the corrective action to be taken whereby selection of the link results in automatically being connected to the internet location or website of the service provider to order a new drive.

In this manner, the leaf nodes having corresponding UI elements in a UI display may provide the customer with one or more actions that may be taken responsive to an existing problem adversely affecting a score of a particular UI element that is a leaf node. For example, if a problem may be resolved by applying or updating software (e.g., software resolvable), one or more links may be displayed that, if selected, automatically update software, apply a patch to correct a problem, and the like. In connection with the actions, information may be displayed regarding potential corrective actions performed manually and/or in an automated manner. Such actions taken in an automated manner may be taken responsive to selection of one or more UI elements, for example, to run additional tests or diagnostics, obtain additional component status information, connect to a wizard or dialog to perform actions that generally assist with troubleshooting and problem diagnostic and resolution.

In at least one embodiment, the data structure such as described above and illustrated in FIGS. 2-6 may be dynamic. If the configuration of the data storage system is modified (e.g., add or remove a logical or physical component), the data structure may be accordingly updated and modified as needed. For example, if an additional RAID group is configured or the new drive is added to replace the faulty RAID-5 group drive as in FIG. 6, the displayed information (e.g. nodes or UI elements 602, 608, and/or 608a) in the example 600 may be accordingly and automatically updated. Similarly, an internal data structure such as illustrated in FIG. 2 for maintaining information about the various nodes and associated components may be accordingly updated.

In connection with processing performed to determine the overall system health or score such as associated with the root node 202 which may be displayed in a UI (e.g., such as illustrated in FIGS. 3, 4, 5, and 6), an override or veto mechanism may be performed after determining a first or initial value denoting the overall system health score (e.g., in accordance with EQUATION 1). The override or veto mechanism processing may be more generally processing performed to handle special cases affecting the overall system health score. In other words, normal processing for determining an initial overall system health score in accordance with EQUATION 1 may be performed. Additionally and subsequently, an embodiment may performed additional processing to handle the special cases or circumstances that may further impact or modify the initial overall system health score. For example, if one or more leaf nodes are critical for business, cause data unavailability or data loss, and the like (e.g., serious error condition or problem not reflected in the normal processing and score calculations), then such special cases or occurrences associated with leaf nodes may be identified in this additional processing and provide for any further adjustments needed to the overall system health score. For example, if component A.B3.C7 related to LUNs in the storage component has a status showing a LUN is offline thereby denoting a condition of data unavailability for that LUN, the additional processing may further adjust the score c7 of node 208b to be zero (0) where the score of zero is further propagated up the tree to the root node on all nodes of the path from the root node 202 to node 208b. In this case, node 208 and node 202 each have scores of zero. It should be noted that an embodiment may perform such adjustment for an unavailable LUN, for example, determined to include business critical data that needs to be available without any down time/unavailability. As another example, normal processing may be performed which first determines the initial overall system health score as described above and then may override the overall score and make adjustment such as when a critical network component or other critical component is down or nonfunctional. For example, in an embodiment of a data storage system include two CPUs, if one of the CPUs is nonfunctional or not operations, the overall system health score may be zero.

It should also be noted that when a score of a component is below a specified threshold value or otherwise has a current problem, a UI element corresponding to the component may be displayed with the score in a visually distinguishing manner. For example, with reference to FIG. 6, UI element 608a may be displayed with a particular color, such as in red or yellow, to denote an alarm condition or state of the score of 70 is below the specified threshold, or more generally, is a leaf node with a pending error or problem status.

Figure 7:
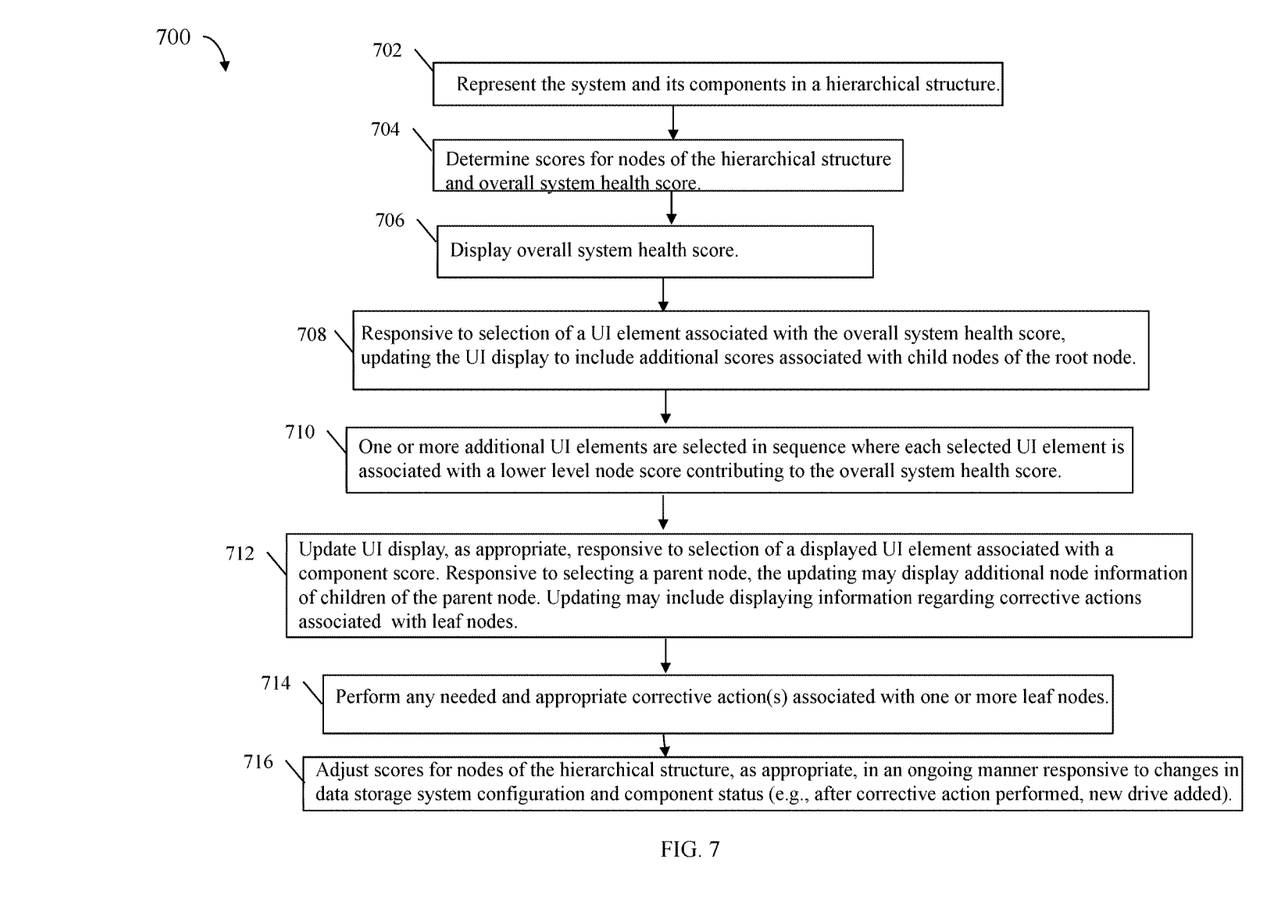
FIG. 7 is a flowchart of processing steps that may be performed in an embodiment in accordance with techniques herein.

Referring to FIG. 7, shown is a flowchart 700 of processing steps that may be performed in an embodiment in accordance with techniques herein. The flowchart 700 generally summarizes processing described above. At step 702, the system and its components may be represented in a hierarchical structure such as a tree structure described above (e.g., FIG. 2). At step 704, scores for the nodes of the hierarchical structure may be determined. In at least one embodiment, as described above, such scores for the nodes at different levels of the tree structure may be determined by obtaining scores for the leaf nodes and then using such leaf node scores in determining scores for parent nodes of the leaf nodes at a next higher level in the tree structure. The foregoing may be repeated by calculating scores of nodes moving up the tree from the leaves to the root node. As described above, a parent node score may be determined as a weighted sum of the scores of its children. Step 704 may also generally include determining the overall system health score such as based on normal processing using weighted scoring for nodes of the tree. As described above, an initial value for the overall system health score may be determined using such normal processing. Subsequently, additional processing may be performed which handle special cases or circumstance and may appropriately override or further adjust the initial value. At step 706, the overall system health score is displayed such as in connection with a UI display. At step 708, responsive to selection of a UI element associated with the overall system health score, the UI display may be updated to include additional scores associated with child nodes of the root node (e.g., such as described in connection with the updated display in FIG. 3 responsive to selecting UI element 301). At step 710, one or more additional UI elements are selected in sequence where each selected UI element is associated with a lower level node score (e.g., further down the tree away from the root node) contributing to the overall system health score. At step 712, the UI display may be updated, as appropriate, responsive to selection of a displayed UI element associated with a component score. Responsive to selecting a parent node, the updating of step 712 may, for example, display additional node information of children of the parent node. Updating may include, for example, displaying information regarding corrective actions associated with leaf nodes. Steps 710 and 712 processing are described, for example, in connection with FIGS. 3, 4, 5 and 6 above. At step 714, any needed and appropriate corrective action(s) associated with one or more leaf nodes may be performed As described above, such corrective actions may be performed in an automated manner, such as responsive to selection of a UI element. At step 716, scores of nodes in the hierarchical structure may be adjusted, as appropriate, in an ongoing manner responsive to changes in data storage system configuration and component status (e.g., after corrective action performed, new drive added). Such score adjustment in step 716 may be performed as part of normal processing for calculating scores as well as any further adjustments performed for additional processing for special cases (veto or override processing as described above to modify the overall system health score as well as other scores of other nodes determined using normal processing).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining health of a system and its components comprising:
   receiving a hierarchical structure including a plurality of levels of nodes including at least three levels of nodes representing the system and components of the system, wherein the plurality of levels of nodes includes a plurality of parent nodes and each of the plurality of parent nodes includes one or more child nodes each assigned a weight that is a percentage denoting a relative importance of said each child node relative to any other child node of said each parent node, and wherein a total of one or more weights of the one or more child nodes for said each parent node is one hundred percent;
   performing first processing that calculates an overall score denoting health of the system, wherein said overall score is determined in accordance with a plurality of other scores for the components in the system, said plurality of other scores being associated with nodes of the hierarchical structure, wherein said first processing includes calculating a score for each of the plurality of parent nodes using another score of each of the one or more child nodes of said each parent node and the weight of said each child node that is a percentage denoting the relative importance of said each child node relative to any other child node of said each parent node; and
   displaying, in a user interface, the overall score.

2. The method of claim 1, wherein a root node of the hierarchical structure represents the overall score denoting health of the system.

3. The method of claim 1, wherein said first processing includes:
   obtaining first scores for leaf nodes of the hierarchical structure; and
   determining one or more second scores for one or more parent nodes of the leaf nodes.

4. The method of claim 3, wherein each of the second scores of a parent node is a weighted sum of scores of a portion of the leaf nodes that are children of the parent node in the hierarchical structure.

5. The method of claim 1, wherein each node of the hierarchical structure that is not a root node, is not a leaf node and has one or more child nodes, has an associated score determined as a weighted sum of scores of its child nodes.

6. The method of claim 1, wherein said first processing includes:
   performing normal processing that determines an initial value for the overall score; and
   performing additional processing which performs any needed adjustment to the initial value for the overall score.

7. The method of claim 6, wherein the additional processing includes performing processing that overrides the initial value and determines a revised value for the overall score in accordance with an occurrence of a special case or condition.

8. The method of claim 1, wherein the overall score is associated with a root node of the hierarchical structure and a first user interface element that is selectable and, responsive to selecting the first user interface element, performing second processing comprising:
updating the user interface to include additional scores associated with child nodes of the root node, wherein each of said additional scores is associated with a user interface element that is selectable.

9. The method of claim 8, further comprising:
selecting a second user interface element associated one of the additional scores, said associated one of the additional scores being associated with a second parent node of the hierarchical structure; and
responsive to selecting the second user interface element, updating the user interface to include second additional scores associated with child nodes of the second parent node.

10. The method of claim 1, further comprising:
updating the user interface to include one or more user interface elements for one or more corrective actions associated with a leaf node of the hierarchical structure.

11. The method of claim 10, wherein the one or more user interface elements includes a first user interface element that, when selected, results in automatically performing a particular one of the corrective actions corresponding to the first user interface element.

12. The method of claim 1, wherein the system is a data storage system and the components include any of storage components, network components, computation components.

13. A system comprising:
one or more processors; and
a memory comprising code stored therein, that, when executed by the one or more processors, performs a method for determining health of a system and its components comprising:
receiving a hierarchical structure including a plurality of levels of nodes including at least three levels of nodes representing the system and components of the system, wherein the plurality of levels of nodes includes a plurality of parent nodes and each of the plurality of parent nodes includes one or more child nodes each assigned a weight that is a percentage denoting a relative importance of said each child node relative to any other child node of said each parent node, and wherein a total of one or more weights of the one or more child nodes for said each parent node is one hundred percent;
performing first processing that calculates an overall score denoting health of the system, wherein said overall score is determined in accordance with a plurality of other scores for the components in the system, said plurality of other scores being associated with nodes of the hierarchical structure, wherein said first processing includes calculating a score for each of the plurality of parent nodes using another score of each of the one or more child nodes of said each parent node and the weight of said each child node that is a percentage denoting the relative importance of said each child node relative to any other child node of said each parent node; and
displaying, in a user interface, the overall score.

14. A non-transitory computer readable medium comprising code stored thereon that, when executed, performs a method for determining health of a system and its components comprising:
receiving a hierarchical structure including a plurality of levels of nodes including at least three levels of nodes representing the system and components of the system, wherein the plurality of levels of nodes includes a plurality of parent nodes and each of the plurality of parent nodes includes one or more child nodes each assigned a weight that is a percentage denoting a relative importance of said each child node relative to any other child node of said each parent node, and wherein a total of one or more weights of the one or more child nodes for said each parent node is one hundred percent;
performing first processing that calculates an overall score denoting health of the system, wherein said overall score is determined in accordance with a plurality of other scores for the components in the system, said plurality of other scores being associated with nodes of the hierarchical structure, wherein said first processing includes calculating a score for each of the plurality of parent nodes using another score of each of the one or more child nodes of said each parent node and the weight of said each child node that is a percentage denoting the relative importance of said each child node relative to any other child node of said each parent node; and
displaying, in a user interface, the overall score.

15. The non-transitory computer readable medium of claim 14, wherein a root node of the hierarchical structure represents the overall score denoting health of the system.

16. The non-transitory computer readable medium of claim 14, wherein said first processing includes:
obtaining first scores for leaf nodes of the hierarchical structure; and
determining one or more second scores for one or more parent nodes of the leaf nodes.

17. The non-transitory computer readable medium of claim 16, wherein each of the second scores of a parent node is a weighted sum of scores of a portion of the leaf nodes that are children of the parent node in the hierarchical structure.

18. The non-transitory computer readable medium of claim 14, wherein each node of the hierarchical structure that is not a root node, is not a leaf node and has one or more child nodes, has an associated score determined as a weighted sum of scores of its child nodes.

19. The non-transitory computer readable medium of claim 14, wherein said first processing includes:
performing normal processing that determines an initial value for the overall score; and
performing additional processing which performs any needed adjustment to the initial value for the overall score.

20. The non-transitory computer readable medium of claim 19, wherein the additional processing includes performing processing that overrides the initial value and determines a revised value for the overall score in accordance with an occurrence of a special case or condition.

* * * * *